US012700226B2

(12) United States Patent
Kim et al.

(10) Patent No.: US 12,700,226 B2
(45) Date of Patent: Aug. 4, 2026

(54) METHOD AND APPARATUS FOR LEARNING DEPENDENCY OF FEATURE DATA

(71) Applicant: ELECTRONICS AND TELECOMMUNICATIONS RESEARCH INSTITUTE, Daejeon (KR)

(72) Inventors: Jaehwan Kim, Daejeon (KR); Jung Jae Yu, Daejeon (KR); Wonyoung Yoo, Daejeon (KR); Juwon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 234 days.

(21) Appl. No.: 18/496,063

(22) Filed: Oct. 27, 2023

(65) Prior Publication Data

US 2024/0177473 A1     May 30, 2024

(30) Foreign Application Priority Data

Nov. 29, 2022    (KR) ........................ 10-2022-0162838

(51) Int. Cl.
*G06V 10/82* (2022.01)
*G06T 7/73* (2017.01)
*G06V 10/77* (2022.01)

(52) U.S. Cl.
CPC ................ *G06V 10/82* (2022.01); *G06T 7/75* (2017.01); *G06V 10/7715* (2022.01); *G06T 2207/30196* (2013.01)

(58) Field of Classification Search
CPC . G06N 3/04; G06N 3/045; G06N 3/08; G06T 2207/30196; G06T 7/75;

(Continued)

(56) References Cited

U.S. PATENT DOCUMENTS 10,452,978 B2    10/2019  Shazeer et al.
11,482,048 B1    10/2022  Diaz-Arias et al.
(Continued)

FOREIGN PATENT DOCUMENTS

KR      10-2021-0049613 A      5/2021
KR         10-2437350 B1      8/2022

OTHER PUBLICATIONS

Bin Li et al. , "Multitask Non-Autoregressive Model for Human Motion Prediction," Feb. 5, 2021, IEEE Transactions Image Processing , vol. 30, 2021, pp. 2562-2572.*
(Continued)

*Primary Examiner* — Omar S Ismail
(74) *Attorney, Agent, or Firm* — LRK PATENT LAW FIRM

(57)     ABSTRACT

A neural network device for learning dependency of feature data includes: a memory in which at least one program is stored; and a processor that performs a calculation by executing the at least one program, in which the processor is configured to acquire graph information including a data node for a human body; extract feature data corresponding to a plurality of joints constituting the human body from the graph information; acquire a self-attention output corresponding to the feature data based on a self-attention mechanism; and generate result data for a motion of the human body based on the self-attention output, and the self-attention output includes position information acquired based on positional encoding of the feature data and structural information acquired based on geodesic encoding of the feature data.

10 Claims, 8 Drawing Sheets

(58) Field of Classification Search

CPC .... G06V 10/7715; G06V 10/82; G06V 10/00; G06V 10/10; G06V 10/12; G06V 20/00; G06V 30/00

See application file for complete search history.

(56)  References Cited

U.S. PATENT DOCUMENTS

| | | | |
|---|---|---|---|
| 2015/0204559 A1* | 7/2015 | Hoffberg | G06N 20/00 |
| | | | 700/278 |
| 2018/0047175 A1* | 2/2018 | Wang | G06T 7/194 |
| 2019/0009133 A1* | 1/2019 | Mettler May | G09B 19/0038 |
| 2020/0160997 A1* | 5/2020 | Bagci | A61B 5/055 |
| 2021/0089904 A1 | 3/2021 | Chung et al. | |
| 2022/0129643 A1 | 4/2022 | Seo | |
| 2022/0379170 A1* | 12/2022 | Menaker | G06V 10/34 |
| 2022/0383578 A1* | 12/2022 | Kennewick, Sr. | G06T 7/20 |
| 2023/0222841 A1* | 7/2023 | Chen | G06V 20/49 |
| | | | 382/103 |
| 2024/0203108 A1* | 6/2024 | Wang | G06V 10/806 |

OTHER PUBLICATIONS

Bin Li et al. , "Multitask Non-Autoregressive Model for Human Motion Prediction," Feb. 5, 2021, IEEE Transactions Image Processing , vol. 30, 2021, pp. 2562-2572.*

Anthony Simeonov et al.,"A Long Horizon Planning Framework for Manipulating Rigid Pointcloud Objects," Nov. 2020, 4th Conference on Robot Learning (CoRL 2020), Cambridge MA, USA <pp. 1-7.*

Ashish Vaswani et al.,"Attention Is All You Need," 2017, 31st Conference on Neural Information Processing Systems (NIPS 2017), Long Beach, CA, USA,pp. 1-8.*

Lulu Chen et al.,"A survey of human motion analysis using depth imagery," Feb. 26, 2013, Pattern Recognition Letters 34 (2013), pp. 1995-2002.*

Franziska Mueller et al., "Real-time Pose and Shape Reconstruction of Two Interacting Hands With a Single Depth Camera," Jul. 12, 2019, ACM Trans. Graph., vol. 38, No. 4, Article 49. Publication date: Jul. 2019 pp. 49:1-49:10.*

Yiran Zhu et al., "PoseGTAC: Graph Transformere Encoder-Decoder with Atrous Convolution for 3D Human Pose Estimation", Proceedings of the Thirtieth International Joint Conference on Artificial Intelligence, IJCAI-2021, pp. 1359-1364.*

Sebastian Handrich et al., "Full-Body Human Pose Estimation By Combining Geodesic Distances and 3D-Point Cloud Registration", ACIVS 2015, Advanced Concepts for Intelligent Vision Systems (pp. 415-426), Springer International Publishing.*

Jaehwan Kim et al., "Global Positional Self-Attention for Skeleton-Based Action Recognition", 2022 26th International Conference on Pattern Recognition (ICPR) Aug. 21-25, 2022, Montréal, Québec, Canada, pp. 3356-3360.*

Ashish Vaswani et al., "Attention Is All You Need", 31st Conference on Neural Information Processing Systems (NIPS 2017), Long Beach, CA, USA.

Yiran Zhu et al., "PoseGTAC: Graph Transformer Encoder-Decoder with Atrous Convolution for 3D Human Pose Estimation", Proceedings of the Thirtieth International Joint Conference on Artificial Intelligence, IJCAI-2021.

Jaehwan Kim et al., "Global Positional Self-Attention for Skeleton-Based Action Recognition", 2022 26th International Conference on Pattern Recognition (ICPR) Aug. 21-25, 2022, Montréal, Québec, Canada.

* cited by examiner 510         530         550

FIG. 8

| Methods | | ST-Net $X = X + P E(\cdot)$ | | ST-Net $const.\alpha=\beta=1,\gamma=0$ | | GPS-Net$(ST_\gamma)$ $\gamma=0$ / param.$\alpha,\beta$ | | GPS-Net$(ST_\beta)$ $\beta=0$ / param.$\alpha,\gamma$ | | GPS-Net$(ST)$ param.$\alpha,\beta,\gamma$ | |
|---|---|---|---|---|---|---|---|---|---|---|---|
| | | Top-1 | Top-5 | Top-1 | Top-5 | Top-1 | Top-5 | Top-1 | Top-5 | Top-1 | Top-5 |
| CS(%) | Joint | 84.23 | 96.97 | 84.48 | 97.06 | 84.34 | 96.86 | 84.87 | 97.09 | 85.36 | 97.14 |
| | Bone | 84.98 | 97.17 | 84.61 | 96.99 | 84.87 | 97.26 | 84.75 | 97.22 | 85.44 | 97.44 |
| | J.Motion | 82.54 | 96.42 | 82.22 | 96.65 | 84.09 | 96.76 | 82.97 | 96.19 | 83.59 | 96.46 |
| | B.Motion | 83.39 | 96.49 | 84.05 | 96.70 | 81.16 | 96.09 | 84.07 | 96.77 | 84.04 | 96.96 |
| | Multi-Stream | 89.10 | 98.32 | 89.03 | 98.44 | 89.34 | 98.38 | 89.56 | 98.38 | 89.01 | 98.66 |
| CV(%) | Joint | 92.03 | 99.07 | 92.14 | 99.02 | 92.40 | 98.86 | 91.17 | 98.05 | 92.07 | 98.63 |
| | Bone | 92.84 | 99.18 | 92.73 | 99.03 | 91.18 | 98.96 | 92.00 | 99.05 | 92.83 | 99.10 |
| | J.Motion | 86.95 | 98.37 | 86.12 | 97.87 | 90.65 | 97.91 | 91.33 | 98.84 | 91.12 | 98.50 |
| | B.Motion | 91.00 | 98.91 | 90.65 | 98.90 | 91.56 | 98.82 | 91.61 | 98.52 | 91.00 | 98.85 |
| | Multi-Stream | 95.08 | 99.58 | 95.04 | 99.47 | 95.37 | 99.58 | 95.61 | 99.49 | 95.74 | 99.58 |

METHOD AND APPARATUS FOR LEARNING DEPENDENCY OF FEATURE DATA

CROSS-REFERENCE TO RELATED APPLICATION

This application claims priority to and the benefit of Korean Patent Application No. 10-2022-0162838, filed on Nov. 29, 2022, the disclosure of which is incorporated herein by reference in its entirety.

BACKGROUND

1. Field of the Invention

The present invention relates to a technique for learning dependency of feature data, and more particularly, to a technique for performing dependency learning based on feature data extracted from image information on an object.

2. Description of Related Art

A graph feature representation (raw node or edge data information of a graph represented as a feature vector in an arbitrary dimensional space through an arbitrary mapping function) is a d-dimensional embedding vector representation of data u in a graph (e.g., an image composed of pixels) in the form of a fixed lattice or an undirected graph or a directed graph through a mapping function f.

Here, it is very important how well implicit dependencies between data nodes inherent on the graph are reflected in the embedded feature representation. As a technology related to the above, an attention mechanism technology effective for feature data dependency learning in the field of neural machine translation (NMT) was disclosed in 2015. The attention mechanism is a method effective for representing longrange & multi-level dependencies between the feature data. Self-attention using the attention mechanism is a non-local operation, and provides the advantages of overcoming locality limitations of the existing convolutional neural networks (CNNs) and efficient kernel size and number calculation. In addition, unlike the pure attention mechanism, the self-attention has the advantage of reflecting long-range dependency on hidden state feature vector information of all data without information loss. This self-attention is usefully used not only in semantic segmentation technology but also in motion recognition technology, etc.

However, when the self-attention is applied to a skeleton-based action recognition technology, there is a problem in that information on the order, position, and structure of feature vectors corresponding to joints is not sufficiently reflected.

SUMMARY OF THE INVENTION

The present invention is directed to providing a method and apparatus for more accurately estimating a motion of an object by reflecting sequential dependency and structural relationships of feature data when self-attention is performed.

According to an aspect of the present invention, there is provided a neural network device for learning dependency of feature data, including: a memory in which at least one program is stored; and a processor that performs a calculation by executing the at least one program, in which the processor is configured to acquire graph information including a data node for a human body; extract feature data corresponding to a plurality of joints constituting the human body from the graph information; acquire a self-attention output corresponding to the feature data based on a self-attention mechanism; and generate result data for a motion of the human body based on the self-attention output, and the self-attention output includes position information acquired based on positional encoding of the feature data and structural information acquired based on geodesic encoding of the feature data.

To acquire the self-attention output, the processor may be further configured to identify a plurality of point positions corresponding to the plurality of joints from the feature data; perform the positional encoding based on the plurality of point positions; identify geodesic positions corresponding to the plurality of joints from the feature data; and perform the geodesic encoding based on the geodesic position.

To identify the geodesic positions corresponding to the plurality of joints from the feature data, the processor may be further configured to identify geodesic distances to the plurality of point positions; generate the plurality of groups based on the geodesic distances; and determine group positions corresponding to the plurality of groups.

To identify the geodesic distances to the plurality of point positions, the processor may be further configured to identify a predetermined one of the plurality of point positions as a reference position, and identify geodesic distances between the plurality of point positions and the reference position.

The plurality of groups may include point positions having the same geodesic distance among the plurality of point positions.

The positional encoding may be performed according to Equation 2 below.

$$PE(p_i) = P(p_i/10000^{2q/d}) \qquad \text{(Equation 2)}$$

Where $p_i$ denotes any one of the plurality of point positions, q denotes a dimension, and d denotes a total embedding dimension value.

The geodesic encoding may be performed according to Equation 3 below.

$$GE(p_i) = \mathcal{P}(g_i/10000^{2q/d}), \qquad \text{(Equation 3)}$$
$$g_i = \mathcal{G}(p_i, p_r)$$

Where $p_r$ denotes the reference position, q denotes a dimension, and d denotes a total embedding dimension value.

According to another aspect of the present invention, there is provided a method of operating a neural network device for learning dependence of feature data, including: acquiring graph information including a data node for a human body; extracting feature data corresponding to a plurality of joints constituting the human body from the graph information; acquiring a self-attention output corresponding to the feature data based on a self-attention mechanism; and generating result data for a motion of the human body based on the self-attention output, in which the self-attention output includes position information acquired based on positional encoding of the feature data and structural information acquired based on geodesic encoding of the feature data.

The acquiring of the self-attention output may include: identifying a plurality of point positions corresponding to the plurality of joints from the feature data; performing the positional encoding based on the plurality of point positions;

identifying geodesic positions corresponding to the plurality of joints from the feature data; and performing the geodesic encoding based on the geodesic position.

The identifying of the geodesic positions corresponding to the plurality of joints from the feature data may include: identifying geodesic distances to the plurality of point positions; generating the plurality of groups based on the geodesic distances; and determining group positions corresponding to the plurality of groups.

The identifying of the geodesic distances to the plurality of point positions may include: identifying a predetermined one of the plurality of point positions as a reference position; and identifying geodesic distances between the plurality of point positions and the reference position.

The plurality of groups may include point positions having the same geodesic distance among the plurality of point positions.

The positional encoding may be performed according to Equation 2 below.

$$PE(p_i) = P(p_i/10000^{2q/d}) \qquad \text{(Equation 2)}$$

Where $p_i$ denotes any one of the plurality of point positions, q denotes a dimension, and d denotes a total embedding dimension value.

The geodesic encoding may be performed according to Equation 3 below.

$$GE(p_i) = \mathcal{P}(g_i/10000^{2q/d}),\qquad \text{(Equation 3)}$$
$$g_i = \mathcal{G}(p_i, p_r)$$

where $p_r$ denotes the reference position, q denotes a dimension, and d denotes a total embedding dimension value.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 8 is a diagram illustrating data recognition results acquired through the learning network structure of FIG. 7.

DETAILED DESCRIPTION OF EXEMPLARY EMBODIMENTS

Figure 1:
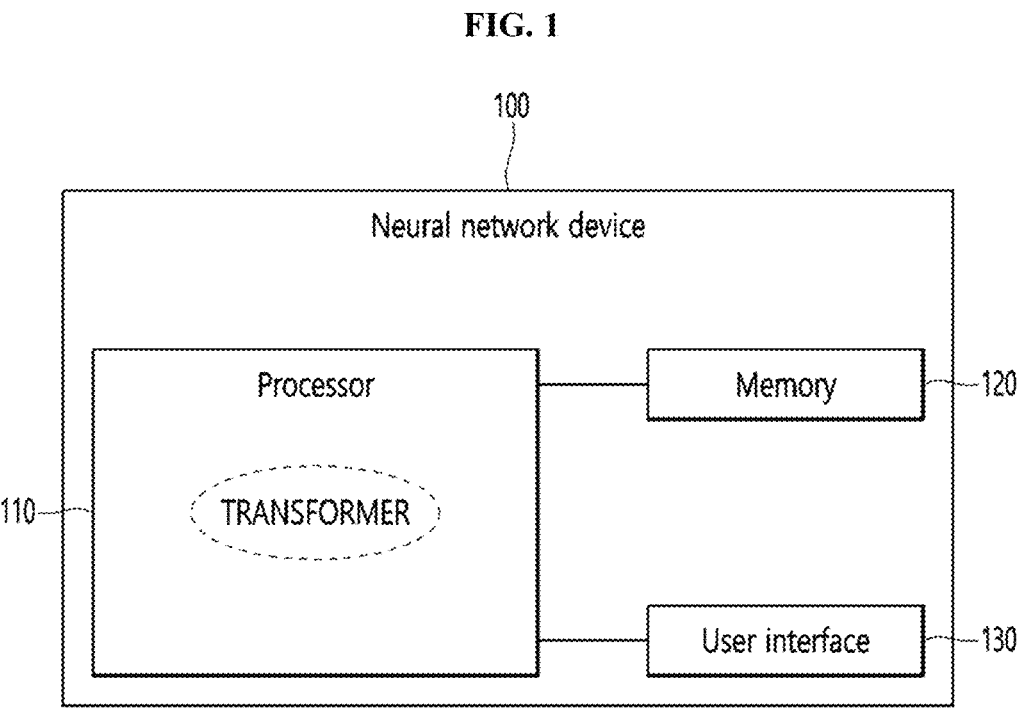
FIG. 1 is a block diagram illustrating a hardware configuration of a neural network device (100) according to an embodiment of the present disclosure.

Phrases such as "in some embodiments" or "in one embodiment" appearing in various places in this specification are not necessarily all referring to the same embodiments.

Some embodiments of the present disclosure may be represented by functional block configurations and various processing steps. Some or all of these functional blocks may be implemented by various numbers of hardware and/or software components that perform specific functions. For example, the functional blocks of the present disclosure may be implemented by one or more microprocessors, or may be implemented by circuit configurations for a predetermined function. In addition, for example, the functional blocks of the present disclosure may be implemented in various programming or scripting languages. Functional blocks may be implemented as algorithms executed by one or more processors. In addition, the present disclosure may employ a conventional technology for electronic environment setting, signal processing, data processing, and/or the like. Terms such as "mechanism," "element," "means," and "configuration" may be used broadly, and are not limited to mechanical and physical configurations.

In addition, connecting lines or connecting members between the components illustrated in the drawings are merely illustrative of functional connections and/or physical or circuit connections. In an actual apparatus, connections between components may be represented by various functional connections, physical connections, or circuit connections that can be replaced or added.

FIG. 1 is a block diagram illustrating a hardware configuration of a neural network device 100 according to an embodiment of the present disclosure.

The neural network device 100 may be implemented in various types of devices such as a personal computer (PC), a server device, a mobile device, and an embedded device. Specific examples of the neural network device 100 may include smartphones, tablet devices, augmented reality (AR) devices, Internet of Things (IoT) devices, autonomous vehicles, robotics, medical devices, and the like, which perform voice recognition, image recognition, and image classification using neural networks, but are not limited thereto. Furthermore, the neural network device 100 may correspond to a dedicated hardware accelerator (HW accelerator) mounted in the above device, and the neural network device 100 may be a hardware accelerator such as a neural processing unit (NPU), a tensor processing unit (TPU), and a neural engine that are dedicated modules for driving a neural network.

Referring to FIG. 1, the neural network device 100 includes a processor 110, a memory 120, and a user interface 130. Only components related to the present embodiments are illustrated in the neural network device 100 illustrated in FIG. 1. Accordingly, it is obvious to those skilled in the art that the neural network device 100 may further include other general-purpose components in addition to the components illustrated in FIG. 1.

The processor 110 serves to control overall functions for executing the neural network device 100. For example, the processor 110 generally controls the neural network device 100 by executing programs stored in the memory 120 of the neural network device 100. The processor 110 may be implemented by a central processing unit (CPU), a graphics processing unit (GPU), an application processor (AP), and the like, which are included in the neural network device 100, but is not limited thereto.

The memory 120 is hardware that stores various types of data processed by the neural network device 100. For example, the memory 120 may store data that has been processed and data that is to be processed by the neural network device 100. In addition, the memory 120 may store applications, drivers, or the like to be driven by the neural network device 100. The memory 120 may include a random access memory (RAM) such as a dynamic random access memory (DRAM) and a static random access memory (SRAM), a read-only memory (ROM), an electrically erasable programmable read-only memory (EEPROM), a CD-ROM, a Blu-ray or other optical disk storage, a hard disk drive (HDD), a solid state drive (SSD), or a flash memory.

The processor 110 may train a motion recognition model through a test data set and estimate a motion of an object from image information based on the trained motion recognition model. Estimating the motion of the object by the processor may be performed based on skeleton tracking using point positions of joints constituting the object and relationship information between the respective joints.

The motion recognition model may be implemented using a transformer model. As the neural network device 100 uses the transformer model, parallel processing of data and rapid calculation are possible.

The processor 110 may train the transformer model using the test data set.

The test data set may be graph information including data nodes. The processor 110 may extract feature data from the test data set. The test data set may include embedded data of image information on the human body.

The feature data may be extracted by a graph feature representation method. More specifically, the feature data may be data acquired by representing node or edge data included in graph information as a feature vector in an arbitrary dimensional space according to an arbitrary mapping function.

The processor 110 may determine information to be attended to among the feature data using the transformer model, and encode the feature data based on the determination result. Here, among the feature data, the information to be attended to may be referred to as attention information.

The processor 110 may determine the type of attention information and encode the feature data in different ways according to the determined type. For example, when the attention information is associated with the position of the test data set, the processor 110 may perform positional encoding on the feature data. For example, when the attention information is associated with the position of the test data set, the processor 110 may perform positional encoding on the feature data. In the present disclosure, the geodesic position encoding may be referred to as geodesic encoding below.

The processor 110 may generate an attention output according to the encoding of the attention information. The attention output may include at least one of the position information and the structural information. The position information may be an attention output generated based on positional encoding of feature data, and the structural information may be an attention output generated based on geodesic encoding of feature data. The position information and the structural information will be described in detail below.

The processor 110 may train the motion recognition model using the attention mechanism, and output result data corresponding to input data based on the trained motion recognition model. Here, the input data may be image information on the human body, and the result data may be motion type information estimated to correspond to the image information.

Figure 2:
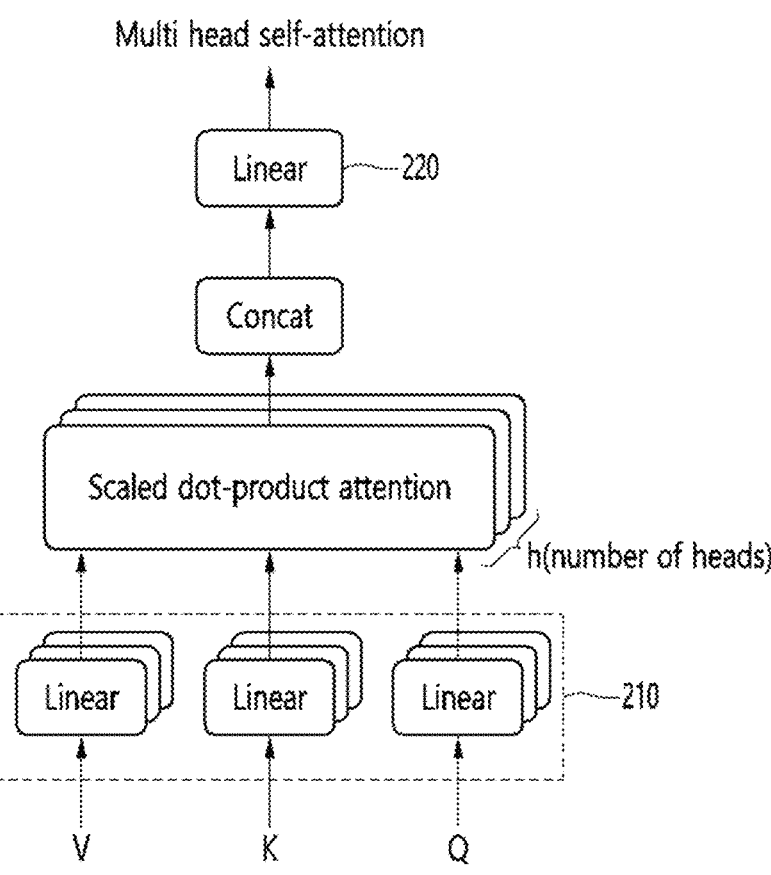
FIG. 2 is an exemplary diagram for describing self-attention according to an exemplary embodiment.

FIG. 2 is an exemplary diagram for describing self-attention according to an exemplary embodiment.

In the skeleton-based motion recognition, the self-attention may be used to measure the relationship between the joints constituting the human body. In this case, a relationship value with other joints may be calculated based on each joint. This value may be referred to as an attention score. The attention score between joints with a high degree of relationship may be high. The attention score made into one table may be referred to as an attention map.

In the transformer model, the attention score may be obtained by performing a scaled dot-product operation between feature vectors corresponding to joints. After obtaining an attention score for a specific joint with other joints, a softmax function may be applied to the attention map in which the attention scores are gathered. As a result, a correlation value for a specific joint with other joints may appear as a probability in the attention map.

A weighted sum is performed between probability values of the attention map and feature vectors corresponding to each existing joint. The weighted sum is an operation of multiplying each probability value and the feature vectors corresponding to each joint and then adding them. The weighted sum result may be used as a vector value for a specific joint.

Multi head self-attention is a method for checking attention for various feature values by creating a plurality of attention maps. The multi head self-attention may be used for a transformer model, an automatic speech recognition (ASR) model, etc., but is not limited thereto.

The multi head self-attention has a form in which scaled dot-product attention structures overlap. The input of the scaled dot-product attention includes a query, a key, and a value. For example, when identifying information on a specific joint based on pre-stored data, the specific joint may correspond to a query, the pre-stored joint may correspond to a key, and the information on the key joint may correspond to a value.

In order to obtain the multi head self-attention, feature values for a value V, a key K, and a query Q are each divided as many as the number h of heads, and are concatenated through a first linear layer 210 and the scaled dot-product attention. Then, when the concatenated value finally passes through the second linear layer 220, the multi head self-attention may be obtained.

Figure 3:
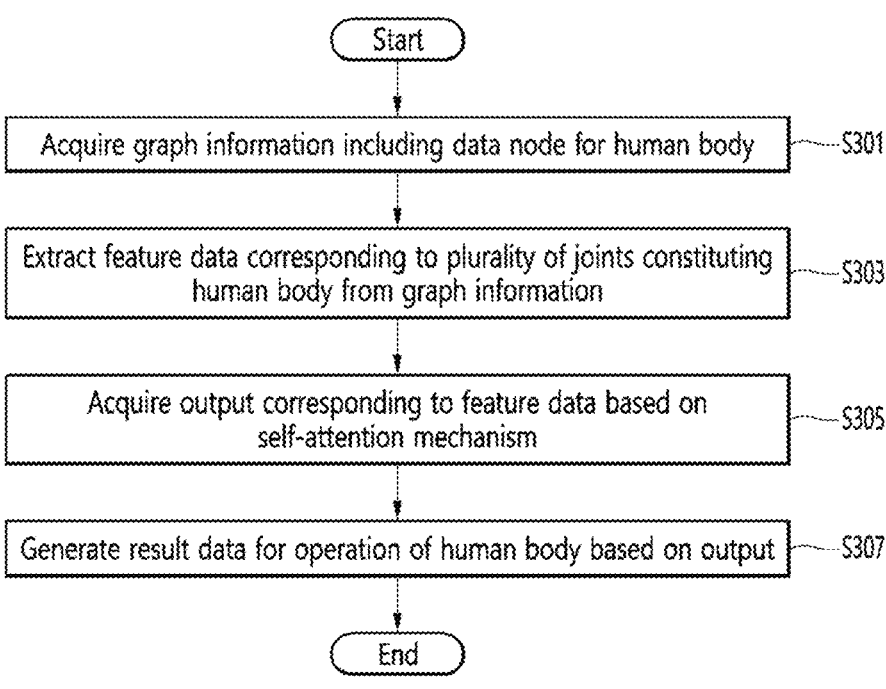
FIG. 3 is a flowchart of an operation of the neural network device (100) according to the embodiment of the present disclosure.

FIG. 3 is a flowchart of an operation of the neural network device 100 according to the embodiment of the present disclosure.

The operation of the neural network device 100 included in the flowchart of FIG. 3 may be understood as the operation of the processor 110 included in the neural network device 100, and each operation has a causal relationship and is not limited to being performed in the listed order unless there is a special circumstance in which it should be performed in the listed order.

In operation S301, the processor 110 acquires graph information including data nodes for a human body.

The graph information may be information extracted, converted, or embedded from image information. Specifically, the graph information may be referred to as a set of specific possible feature data including node or edge data.

The graph information may be object information for graph feature representation. The graph feature representation may represent node or edge data of graph information as a feature vector in an arbitrary dimensional space through an arbitrary mapping function. Therefore, the data node is arbitrary data included in a graph in the form of a fixed lattice, an undirected graph, or a directed graph, and may be a vector representation embedded in an arbitrary dimension. A plurality of data nodes included in the graph information may have an implicit dependency on each other.

The image information is information including an image of a human body, and may include visual information for directly or indirectly identifying an external appearance of the human body, such as a silhouette, a photograph, or a shadow of a person. The external appearance of the human body may be a posture, a shape, a motion, and the like, and the visual information may be information obtainable through an optical input means such as a camera.

A data node for a human body may be a data node associated with an image area corresponding to a human body in image information.

In operation S303, the processor 110 extracts feature data corresponding to a plurality of joints constituting the human body from the graph information.

The processor 110 may extract feature data based on graph information or data nodes included in the graph information. The feature data may be data corresponding to joints among the image areas of the human body included in the image information. Here, the joint may be a joint point corresponding to a joint constituting the human body on the image area.

More specifically, the joint may be understood to be a skeleton joint used in the skeleton-based motion recognition. The skeleton-based motion recognition involves collecting a plurality of skeleton joints through an optical sensor and training behavior classification through an artificial neural network.

The processor 110 may acquire, as the feature data, information on the positions, movements, and connection relationships of the plurality of joints constituting the human body through the graph information. The feature data corresponding to the joint may be represented as a vector having an arbitrary dimension.

In operation S305, the processor 110 acquires an output corresponding to the feature data based on the self-attention mechanism.

The processor 110 may perform mutual dependency learning between a plurality of feature data corresponding to a plurality of joints in a layer of the transformer model.

The layer may include at least one self-attention head. Each self-attention head includes key, value, and query matrices, and the processor 110 generates a self-attention output through an operation between the feature data and these matrices. The self-attention head is derived from Equation 1 below.

$$Self. \, Att(Q, K, V) = \sigma\left(\frac{QK^T}{\sqrt{d}}\right)V = \sigma\left(\frac{XW_Q(XW_K)^T}{\sqrt{d}}\right)XW_V \qquad \text{[Equation 1]}$$

Here, Q denotes a query, K denotes a key, V denotes a value, and $W_Q$, $W_K$, and $W_V$ denote project matrices that can be trained for feature data X input as weight parameters of a head. A dimension of each parameter is represented as Q, $K \in R^{N \times d}$, $W_Q$, $W_K \in R^{d_h \times d}$, and $W_V \in R^{d_h \times d}_v$, where N denotes the number of tokens of a sentence, and d, $d_v$, and $d_h$ denote the dimensionality of dimensions of query, value, and embedding, respectively.

The processor 110 may represent a correlation between feature data by performing a dot-product of a d-dimensional query and a key.

However, despite the advantages of reflecting long-distance dependencies and maintaining all feature vector information, there is a problem in that the information on the position and order of the input feature data is not considered due to permutation-invariance which is an essential attribute of the self-attention. This serves as a limitation in that relational information between the feature data is not properly expressed in the skeleton-based motion recognition in which the structural information such as the order and positions of the feature vectors is important.

Therefore, according to an embodiment of the present disclosure, by performing additional attention that includes the positional encoding considering the information on the positions (and order) of each joint and the geodesic encoding considering the information on the structure formed by the plurality of joints, it is possible to train the transformer model that more accurately implements the skeleton-based motion recognition.

According to an embodiment, the positional encoding for considering the information on the positions of each joint may be performed according to Equation 2 below.

$$PE(p_i) = P(p_i / 10000^{2q/d}) \qquad \text{[Equation 2]}$$

Here, $p_i$ denotes the data position, q denotes the dimension of the position embedding corresponding to the data position, and d denotes the dimensionality of the position embedding (and of other vectors processed by the neural network). $P(\bullet)$ denotes a periodic function, and is defined as sine and cosine functions for even and odd q dimensions, respectively.

The data position may be a point position of a joint. More specifically, the point position may be coordinate information of a skeleton joint. For example, the processor 110 may acquire a total of 50 pieces of data as x coordinates and y coordinates for each of the 25 skeleton joints, and perform the positional encoding by using the acquired data as the data position $p_i$.

However, even when the positional encoding is performed, the structural information on the relationship between the plurality of joints may not be included in the self-attention output. In order to train the skeleton-based motion recognition model with higher accuracy by applying the self-attention mechanism, it is necessary to understand the structure based on the relationship between the plurality of joints.

The processor 110 of the neural network device 100 according to the embodiment of the present disclosure may reflect the geodesic positions of the plurality of joints and acquire the self-attention output reflecting the structural information on the joints from the feature data.

According to an embodiment, the geodesic encoding for considering the information on the structure formed by the plurality of joints may be performed according to Equation 3 below.

$$GE(p_i) = \mathcal{P}\left(g_i / 10000^{2q/d}\right), \qquad \text{[Equation 3]}$$

$$g_i = \mathcal{G}(p_i, p_r)$$

Unlike the positional encoding function of Equation 2, the data position $p_i$ value may be replaced with a $g_i$ value of a geodesic encoding function $G(p_i, p_r)$. The geodesic encoding function $G(p_i, p_r)$ in Equation 3 may be defined as a group position value after clustering the arbitrary number based on the predetermined reference position $p_r$ and a geodesic distance between all positions $$\{p_i\}_{i=0}^{N}.$$

Here, the group position value may be defined as $g_i$ and may be a position value assigned to at least one clustered group. The processor 110 may perform the geodesic encoding using the group position value $g_i$.

The self-attention output may be generated by summing the attention result value acquired according to Equation 1, the position information acquired according to the positional encoding of Equation 2, and the structural information acquired according to the geodesic encoding of Equation 3.

In operation S307, the processor 110 generates the result data on the motion of the human body based on the output.

The result data is output data generated according to the self-attention of the input feature data, and may be classification information on motions, postures, behaviors, and the like of the human body included in the image information. The processor 110 may generate at least one piece of result data corresponding to the feature data input through the self-attention output, and provide the probability corresponding to the generated result data.

Figure 4:
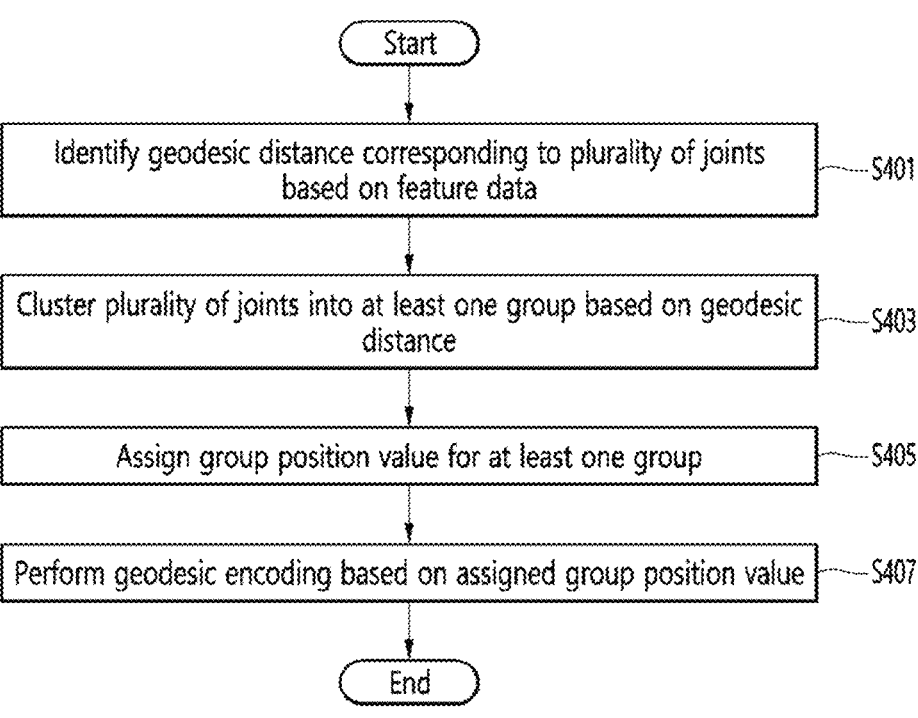
FIG. 4 is a flowchart of an operation in which the neural network device (100) performs geodesic encoding according to the embodiment of the present disclosure.

FIG. 4 is a flowchart of an operation in which the neural network device 100 performs geodesic encoding according to the embodiment of the present disclosure.

Each operation included in the flowchart of FIG. 4 may be an operation included in operation S305 of FIG. 3.

In operation S401, the processor 110 identifies the geodesic distances corresponding to the plurality of joints based on the feature data.

Here, the feature data is data extracted from the graph information, and may be data on the plurality of joints included in the image information on the human body. The geodesic distance corresponding to the plurality of joints may be the geodesic distance assigned to each of the plurality of joints with respect to the predetermined reference position.

The predetermined reference position may correspond to the point position of any one of the plurality of joints. The reference position may be determined or changed based on the predetermined data or external input. When the reference position is changed, the geodesic distance assigned to each of the plurality of joints may be changed.

In operation S403, the processor 110 clusters the plurality of joints into at least one group based on the geodesic distance.

The processor 110 may identify the geodesic distances corresponding to at least two of the plurality of joints, and when the at least two identified geodesic distances are the same or fall within a predetermined threshold range, the at least two corresponding joints may be clustered into one group.

The processor 110 may cluster the corresponding groups according to the identified geodesic distances.

For example, the processor 110 may identify the point position corresponding to any one of the plurality of joints as the reference position. Thereafter, the processor 110 may identify the point position (hereinafter referred to as "1-1$^{th}$ point position") corresponding to the other of the plurality of joints, and determine the geodesic distance (hereinafter, "first distance") between the reference position and the 1-1$^{th}$ point position. Thereafter, the processor 110 may identify a point position (e.g., 1-2th point position to 1-5th point position) corresponding to at least one joint having a geodesic distance equal to the first distance among the plurality of joints, and determine, as a first group, the 1-1$^{th}$ point position separated by the first distance that is the same geodesic distance from the reference position and the joint corresponding to the 1-1$^{th}$ point position. The processor 110 may determine a second group and a third group in the same manner as the process of determining the first group.

In operation S405, the processor 110 allocates a group position value for at least one group.

The processor 110 may generate the number of group position values corresponding to the number of clustered groups in operation S403. For example, the processor 110 may allocate the first group position to the first group and the second group position to the second group.

Here, the group position value may be a value related to the geodesic distance to the reference position. Accordingly, the group position value may be a value determined according to the reference position.

In operation S407, the processor 110 performs the geodesic encoding based on the assigned group position value.

The processor 110 may acquire the structural information through the geodesic encoding by applying the group position value to $g_i$ of the geodesic encoding function. The processor 110 may identify which structure the joint corresponding to the feature data forms based on the structural information.

Figure 5:
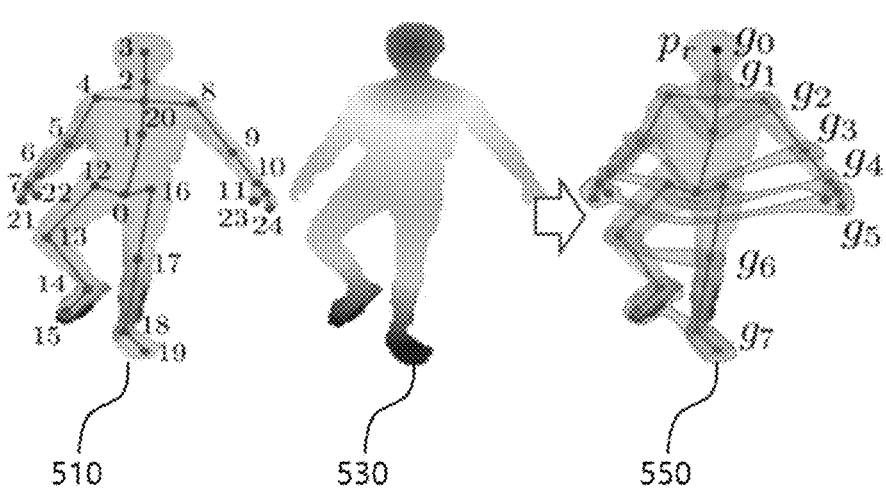
FIG. 5 is a diagram illustrating a process in which the neural network device (100) according to the embodiment of the present disclosure acquires a group position value for geodesic encoding.

FIG. 5 is a diagram illustrating a process in which the neural network device 100 according to the embodiment of the present disclosure acquires a group position value for geodesic encoding.

Referring to FIG. 5, description of a process of using the feature data corresponding to the image information to acquire the group position value will be divided into a first image 510, a second image 530, and a third image 550.

The first image 510 illustrates the point positions of the plurality of joints mapped to the image information based on the feature data. For example, there may be a total of 25 point positions corresponding to the plurality of joints. Each point position may be connected to other adjacent point positions.

The processor 110 may determine any one of 25 point positions to be a reference position. For example, the processor 110 may determine a point position corresponding to a head (id: 3) to be a reference position.

When the reference position is the head, the second image 530 is illustrated by dividing image information into color information based on the geodesic distance of the feature data with respect to the reference position. The second image 530 may be referred to as a color map. Colors separately displayed in the color map may not be limited to the point positions for the plurality of joints.

The head area corresponding to the reference position is displayed in red, and may change in order of yellow, green, and blue as the distance from the reference position increases.

The third image 550 is illustrated by being divided so that the point positions assigned the geodesic distance that is equal to the reference position or falls within the predetermined threshold range belong to one group. For example, according to the third image 550, a point position (id=3) of the reference area positioned at the reference position $p_r$ may be determined as a reference group g0, a point position (id=2, 20) of a first area may be determined as a first group g1, a point position (id=1, 4, 8) of a second area may be determined as a second group g2, a point position (id=0, 5, 9) of a third area may be determined as a third group g3, a point position (id=6, 10, 12, 16) of a fourth area may be determined as a fourth group g4, a point position (id=7, 11, 21, 22, 23, 24) of a fifth area may be determined as a fifth group g5, a point position (id=13, 17) of a sixth area may be determined as a sixth group g6, and a point position (id=14, 15, 18, 19) of a seventh area may be determined as a seventh group g7.

The processor 110 may assign a corresponding group position value to each of the reference group g0 to the seventh group g7 of the third image 550. A plurality of point positions corresponding to a plurality of joints are geometrically divided according to the group position value, and the processor 110 may acquire the self-attention output including the structural information through the geodesic encoding reflecting the group position value.

Figure 6:
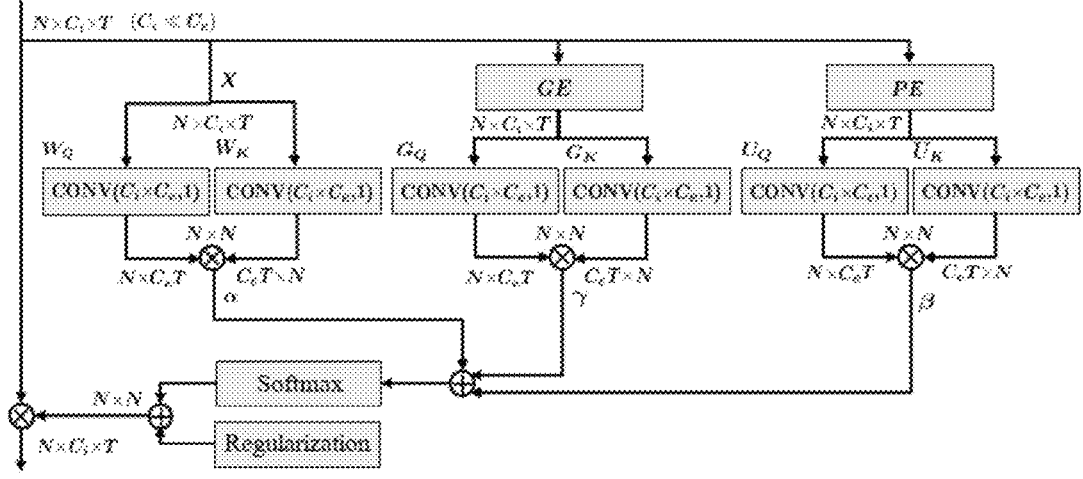
FIG. 6 is a configuration diagram of the self-attention performed by the neural network device (100) according to the embodiment of the present disclosure.

FIG. 6 is a configuration diagram of the self-attention performed by the neural network device 100 according to the embodiment of the present disclosure.

Referring to FIG. 6, $X \in R^{N \times C_i \times T}$, N, $C_i$, and T denote input feature data, the number of feature vectors (the number of nodes in the case of the graph structure), a feature channel dimension, and a time dimension (T=1 in the case of static data, dynamic data case T>1), respectively. CONV($C_i \times C_e$, 1) denotes a $C_i \times C_e$ convolution function with a kernel size of 1.

$$GPS.Att(Q, K, V) = \\ \sigma\left(\alpha\frac{XW_Q(XW_K)^T}{\sqrt{d}} + \beta\frac{PU_Q(PU_K)^T}{\sqrt{d}} + \gamma\frac{SG_Q(SG_K)^T}{\sqrt{d}}\right)XW_V$$

[Equation 4]

As shown in Equation 4, the final geodesic positional self-attention may be composed of a weighted sum of three correlations of cross-spatial dependencies XWQ(XWK) T, cross-sequential positional dependencies PUQ(PUK) T, and cross-geodesic positional dependencies SGQ(SGK) T. P and S may be defined as a conventional position value obtained through Equations 2 and 3, and the geodesic position value of the present invention, respectively. As the learning parameters, the weights $\alpha$, $\beta$, and $\gamma$ may have a constraint of $\alpha+\beta+\gamma=1$.

Figure 7:
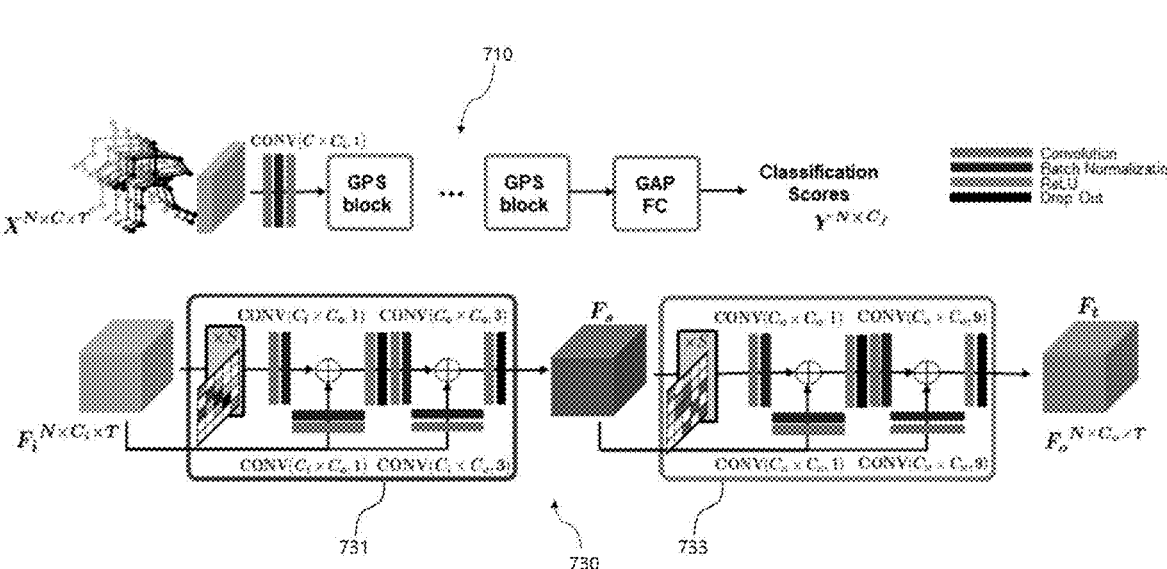
FIG. 7 illustrates a learning network structure configured to verify the effect of the neural network device (100) according to the embodiment of the present disclosure.

FIG. 7 illustrates a learning network structure configured to verify the effect of the neural network device 100 according to the embodiment of the present disclosure.

FIG. 7 illustrates an entire network 710 for input data X and one geodesic positional self-attention (GPS) block 730 of the entire network 710. One GPS block 730 is composed of one GPS block 731 and one conventional temporal self-attention block 733 for feature data $F_i$. Since the learning and recognition data are time sequential data, the temporal self-attention is applied. In the effect experiment according to FIG. 7, the learning and recognition are performed with a network structure in which three layers of one GPS block 730 are connected. Finally, for the last feature data, a classification score $Y^{N \times C_f}$ is obtained after global average pooling (GAP) and fully connected layers (FC). $C_f$ denotes the number of target classes.

FIG. 8 is a diagram illustrating data recognition results acquired through the learning network structure of FIG. 7.

FIG. 8 illustrates learning experiment results of a network to which the GPS of the present disclosure is applied with respect to the reference data. Referring to FIG. 8, the learning of the network to which the GPS of the present disclosure is applied shows a multi-stream framework-based learning result considering both single-stream framework-based learning of a joint, a bone, a joint-motion, and a bone-motion and overall results in the same manner as the configuration of the reference data (ensemble learning by summing all inference results after min-max normalization). ST-Net may be a network using a general self-attention module structure based on Equation 1. In this case, the temporal self-attention module may be the same as or similar to that of FIG. 7.

From the left in FIG. 8, the ST-Net learning result based on the general positional encoding of Equation 2, the ST-Net learning result based on self-attention with $\alpha=\beta=1$ except for the geodesic encoding of Equation 4, and the result through selective learning of each weight in Equation 4 of the present invention are collected, compared, and illustrated.

As a result, it can be seen that the result is relatively excellent when the geodesic position encoding (the term to which the weight $\gamma$ is applied), which is the third term included in Equation 4 of the present disclosure, is summed.

According to the present disclosure, it is possible to more accurately estimate a motion of an object by reflecting sequential dependency and structural relationships of feature data when self-attention is performed.

Those skilled in the art related to this embodiment will be able to understand that the embodiment may be implemented in a modified form without departing from the essential characteristics of the above description. Therefore, embodiments disclosed herein should be considered in an illustrative aspect rather than a restrictive aspect. The scope of the present invention should be defined by the claims rather than the above description, and equivalents to the claims should be interpreted to fall within the present embodiment.

What is claimed is:

1. A neural network device for learning dependence of feature data, comprising:

a memory in which at least one program is stored; and a processor that performs a calculation by executing the at least one program, wherein the processor is configured to:

acquire graph information including a data node for a human body;

extract feature data corresponding to a plurality of joints constituting the human body from the graph information;

acquire a self-attention output corresponding to the feature data based on a self-attention mechanism, wherein, to acquire the self-attention output, the processor is further configured to:

identify a plurality of point positions corresponding to the plurality of joints from the feature data;

perform the positional encoding based on the plurality of point positions, wherein the positional encoding is performed according to Equation 2 below:

$$PE(p_i)=P(p_i/10000^{2q/d})$$ (Equation 2),

13 where $p_i$ denotes any one of the plurality of point positions, q denotes a dimension, and d denotes a total embedding dimension value;

identify geodesic positions corresponding to the plurality of joints from the feature data; and perform the geodesic encoding based on the geodesic position; and generate result data for a motion of the human body based on the self-attention output, and the self-attention output includes position information acquired based on positional encoding of the feature data and structural information acquired based on geodesic encoding of the feature data.

2. The neural network device of claim 1, wherein, to identify the geodesic positions corresponding to the plurality of joints from the feature data, the processor is further configured to:

identify geodesic distances to the plurality of point positions;

generate the plurality of groups based on the geodesic distances; and determine group positions corresponding to the plurality of groups.

3. The neural network device of claim 2, wherein, to identify the geodesic distances to the plurality of point positions, the processor is further configured to: identify a predetermined one of the plurality of point positions as a reference position, and identify geodesic distances between the plurality of point positions and the reference position.

4. The neural network device of claim 3, wherein the plurality of groups include point positions having the same geodesic distance among the plurality of point positions.

5. The neural network device of claim 3, wherein the geodesic encoding is performed according to Equation 3 below:

$$GE(p_i) = \mathcal{P}\left(g_i/10000^{2q/d}\right), \qquad \text{(Equation 3)}$$

$$g_i = \mathcal{G}(p_i, p_r),$$

where $p_r$ denotes the reference position, q denotes a dimension, and d denotes a total embedding dimension value.

6. A method of operating a neural network device for learning dependence of feature data, comprising:

acquiring graph information including a data node for a human body;

extracting feature data corresponding to a plurality of joints constituting the human body from the graph information;

acquiring a self-attention output corresponding to the feature data based on a self-attention mechanism, wherein the acquiring of the self-attention output includes:

identifying a plurality of point positions corresponding to the plurality of joints from the feature data;

performing the positional encoding based on the plurality of point positions, wherein the positional encoding is performed according to Equation 2 below:

$$PE(p_i)=P(p_i/10000^{2q/d}) \qquad \text{(Equation 2)},$$

where $p_i$ denotes any one of the plurality of point positions, q denotes a dimension, and d denotes a total embedding dimension value;

identifying geodesic positions corresponding to the plurality of joints from the feature data; and performing the geodesic encoding based on the geodesic position; and generating result data for a motion of the human body based on the self-attention output, wherein the self-attention output includes position information acquired based on positional encoding of the feature data and structural information acquired based on geodesic encoding of the feature data.

7. The method of claim 6, wherein the identifying of the geodesic positions corresponding to the plurality of joints from the feature data includes:

identifying geodesic distances to the plurality of point positions;

generating the plurality of groups based on the geodesic distances; and determining group positions corresponding to the plurality of groups.

8. The method of claim 7, wherein the identifying of the geodesic distances to the plurality of point positions includes:

identifying a predetermined one of the plurality of point positions as a reference position; and identifying geodesic distances between the plurality of point positions and the reference position.

9. The method of claim 8, wherein the plurality of groups include point positions having the same geodesic distance among the plurality of point positions.

10. The method of claim 8, wherein the geodesic encoding is performed according to Equation 3 below:

$$GE(p_i) = \mathcal{P}\left(g_i/10000^{2q/d}\right), \qquad \text{(Equation 3)}$$

$$g_i = \mathcal{G}(p_i, p_r),$$

where $p_r$ denotes the reference position, q denotes a dimension, and d denotes a total embedding dimension value.

* * * * *